J. P. BETHKE.
AUTOGRAPHIC CAMERA.
APPLICATION FILED JULY 29, 1920.
1,375,816.
Patented Apr. 26, 1921.
2 SHEETS—SHEET 1.
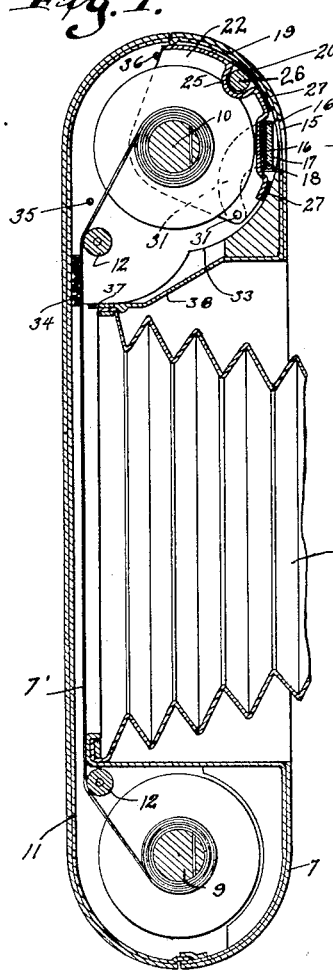

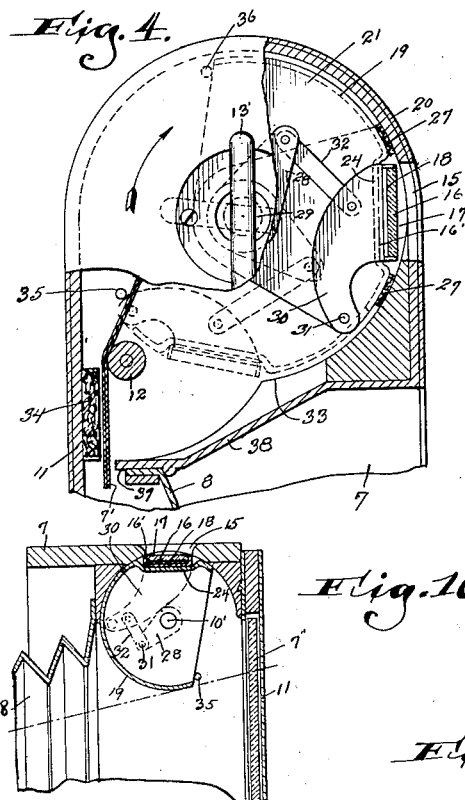

UNITED STATES PATENT OFFICE.

JOHN P. BETHKE, OF MILWAUKEE, WISCONSIN.

AUTOGRAPHIC CAMERA.

1,375,816. Specification of Letters Patent. Patented Apr. 26, 1921.

Application filed July 29, 1920. Serial No. 399,849.

*To all whom it may concern:*

Be it known that I, JOHN P. BETHKE, a citizen of the United States, and resident of Milwaukee, in the county of Milwaukee and State of Wisconsin, have invented new and useful Improvements in Autographic Cameras, of which the following is a description, reference being had to the accompanying drawings, which are a part of this specification.

The invention relates to autographic cameras.

The invention is more particularly designed to provide in combination with a camera a writing surface for receiving data and through light imparting means reproducing this data upon a sensitized plate or film disposed within the camera. Though the invention is particularly adapted for a film camera using film cartridges it may also be used in connection with film pack cameras and plate cameras.

The invention is further designed to provide an autographic device for a camera employing a writing surface or printing member which is provided with a coating of phosphorescent or other luminous material which has the property of being affected by light when exposed to the same, to the extent of giving off actinic rays.

The invention is further designed to provide a luminous writing surface which is normally exposed to light and is constantly absorbing the same so that it may store up the light for use in making the print of the desired data upon the sensitized material.

A further object of the invention is to so mount the writing surface on the camera that it may be written on from the outside of the camera and then by means of suitable mechanism be moved to printing position adjacent the sensitized material.

A further object of the invention is to provide a revoluble septum in combination with an opening in the camera with the writing surface disposed adjacent thereto, which septum covers the opening in the camera, just referred to, at all times and thus makes the same light tight.

A further object of the invention is to provide a pocket in the septum for receiving and holding a pencil within the camera so it cannot be lost and may be used when desired.

A further object of the invention is to provide a simple and efficient mechanism for operating the printing member or writing surface whereby it is only necessary to turn the key of the film spool forward and backward to accomplish the printing.

Another advantage of the construction is the mounting of the writing surface on the camera in such a position as to enable the operator to use the body of the camera for a hand rest while writing.

The invention further consists in the several features hereinafter set forth and more particularly defined by claims at the conclusion hereof.

In the drawings:

Figure 1 is a vertical sectional view through a camera, parts being broken away, with the device embodying the invention applied thereto, the section being taken on the line 1—1 of Fig. 2; Fig. 2 is a front elevation of the upper part of the camera, parts being broken away to disclose the interior construction and the autographic device, the writing surface being shown in data receiving position; Fig. 3 is a rear view of the upper portion of the camera, with the back removed, the writing surface being shown in data-imparting position; Fig. 4 is an enlarged end view of the autographic camera, portions being broken away to disclose the operating mechanism, and the writing member in data-receiving position; Fig. 5 is an enlarged end view similar to Fig. 4 showing the writing member in data-imparting position; Fig. 6 is a section taken on the line 6—6 of Fig. 2; Fig. 7 is a detail sectional view taken on the line 7—7 of Fig. 2; Fig. 8 is a detail sectional view similar to Fig. 4 showing a slightly modified construction; Figs. 9 and 9ª are views of a modified form of writing surface; Figs. 10 and 11 are sectional views similar to Figs. 4 and 5 respectively showing the invention applied to a plate or film pack camera.

In general the device comprises the combination with a camera having an opening therein, of a printing means adjacent said opening, means adjacent the opening for excluding light from the interior of the camera, and mechanism for moving the printing means into data-receiving position and data-imparting position.

In the drawings, I have shown the autographic device applied to a well-known form of folding camera using roll films. This camera comprises a body 7, provided with bellows 8 and having film spools 9 and 10, the film 7' with its usual backing being unwound from the spool 9 and thence passing over guide rollers 12 and wound up on the spool 10, the camera being provided with a removable back 11. The film is wound up on the spool 10 by means of a key or handle 13 having a key 14 at its inner end adapted to be removably engaged with a key slot 10' in the film spool 10 so as to turn the spool on the turning of the handle 13, Figs. 1, 3 and 6. This film-turning means is usually provided with a ratchet or friction arrangement preventing the loosening up of the film on the spool and the turning of the same in the wrong direction. The other end of the spool 10 is journaled on a slidable key 13' having a key-way slot 14' therein, said spool having an aperture at this end for receiving the end of said key, as is usual in this type of camera. The casing of the camera body 7 is provided with an opening 15 in the present instance in the front of the camera adjacent which the printing means is disposed so that said means may receive the data to be printed upon the film. While the roll film camera has been shown it will be understood that the device can be used on a camera using a film pack or sensitized plates as shown in Figs. 10 and 11.

The printing means consist of a writing surface and a source of light for printing the characters or data written upon the surface upon the sensitized material. The writing surface consists of a translucid material 16 secured in a support 16' and which may be written upon as shown in Figs. 2 and 3 with a lead pencil or other marking device. I preferably use a strip of glass having its outer surface 17 ground or frosted to permit writing thereon with the ordinary lead pencil so that the marking may be readily removed from the surface with a rubber eraser though the same results may be obtained by the use of celluloid or other translucid material. The source of light employed is the luminosity emanating from a coating 18 of luminous paint, such as a phosphorescent paint, or other material which will give or radiate light to act upon the sensitized material when within the camera. Instead of the translucid material other material such as paper or metal 17' may be used and the marking done directly upon the luminous paint 18 with which this material is coated as shown in Fig. 9.

The means for excluding light from the interior of the camera consists of a movable septum 19 in the form of a partial cylinder to form a curved surface shaped to conform to the curved end 20 of the camera body 7 and slidable with respect thereto. This septum has inwardly extending flanges 21 and 22 at its ends which are journaled on a bearing 23 for the keyed handle 13 and upon the key 13' respectively, so that the septum is revoluble about its points of pivotal support. In case the device is used with a film pack or plate camera the septum will of course be journaled on its own bearing means within the camera such as a single rod 10' or two pivot pins, similar to the keys for the spool. The septum is provided with a longitudinally extending recess or groove 24 in which the writing surface is normally positioned so that said surface will be disposed adjacent the opening 15 in the camera to permit writing thereon. The septum is also provided with a longitudinally extending recess or pocket 25 for receiving a lead pencil or other marking device 26. In the drawings I have strips 27 of light impermeable material secured within the casing of the camera adjacent to and surrounding the opening 15 to prevent light from passing through said opening and between the septum and the interior of the camera but these may be omitted by providing a light-tight fit between the septum and the camera casing as shown in Fig. 8. The septum is of a length to cover the opening at all times.

The mechanism for moving the printing means from data-receiving position to data-imparting position comprises means for moving the septum and the luminous writing surface. This means comprises mechanism for partially moving both the septum and the luminous writing surface and thereafter independently moving the writing surface into printing position. This mechanism consists of a crank 28 having a key 29 engaging in the key way 14' in the key 13', and levers 30 hook shaped to clear the roller 12 and fixedly connected to the support 16' for the printing member and pivotally connected to pins 31 secured on the flanges 21 and 22 of the septum and a link 32 pivotally connected at one end with the crank 28 and at its other end with an intermediate portion of one of the levers 30, Figs. 2, 4 and 5. While the septum is freely movable about its points of pivotal support and not directly connected to the crank 28 it will be noted from Fig. 4 that the arrangement of the crank 28, link 32 and lever 30 is such that the rotation of the key 13' and crank 28 will cause both the printing means and the septum to rotate together until the writing surface passes beyond the curved frame portion 33 of the camera at which time the printing means is independently moved by the crank 28, link 32 and lever 30 swinging the printing means down and backwardly against the front side of the film, Fig. 5. In order that the film may be firmly held while the printing is being done a backing member 34 is secured to the back 11 of the camera and adapted to be brought in contact with the back of the film adjacent the printing means when said printing means is in printing position, the printing mechanism serving as a clamp so that only that portion of the film will be affected with which the writing surface is in contact. While the mechanism is such as to stop the movement of the septum in either of its extreme positions I have shown pins 35 and 36 secured to the camera casing for positively insuring the stopping of the movement of the septum. It will also be noted in the present construction that the inner edge 37 of the camera frame member 38 is spaced away from the film. This is for the purpose of preventing any shadow line between the picture proper and the autograph as the rays from the lens at this edge of the picture meet the rays of light from the printing member at this point which would not be the case if the inner edge 37 were brought back into engagement with the film.

In Figs. 10 and 11 I have shown the invention applied to a camera adapted for a plate or film pack, the drawings showing a plate 7" disposed within the camera though a film pack can be used instead of the plate. The parts in these figures have been numbered to correspond with those previously described and septum 19 with the crank 28 is adapted to be turned from without the camera by a key similar to the key 13' secured to the rod 10'.

The operation of the device is as follows: In its normal or data-receiving position the writing surface is disposed adjacent the opening 15 in the camera and exposed to outside light and in this position the operator using the outside of the body of the camera as a hand rest makes the desired inscription or marking on the surface with a lead pencil or other marking device as shown in Figs. 1, 2 and 4. Then by simply giving the key 13' a partial turn the writing surface together with the septum is revolved through the crank 28, lever 30 and link 32 to the position shown in dotted lines in Fig. 4 after which a further turning of the key 13' moves the writing surface into clamping and printing position adjacent the film, the writing on the surface now being inverted from what it was when made so as to print it in right side up position on the print from the negative or film. When in printing position the light emitted from the luminous material passes through the glass of the writing surface and thus affects the portion of the film lying adjacent thereto while the opaque lines on the writing surface exclude the light from the film so that it does not affect the film with the result that when the film is developed the negative will show a white inscription against a black ground and when the negative is printed the inscription shows up in black against a white background. The pencil 26 is carried in the pocket 25 in the septum, Figs. 1 and 2, so that by a partial turn of the septum, which however, is not sufficient to expose the luminous writing surface to the film, the pencil may be removed for writing, the construction thus affording a convenient means for holding the pencil without interference within the camera and for providing against its loss. When the writing surface is brought into printing relation with the film it is allowed to remain there for a brief period and then turned back to data-receiving position in which position the data may be erased from the writing surface by an ordinary eraser so as to receive other data.

The action of the luminous material is of such a character as not to affect the film while the writing surface is being moved to printing position and my experiments show that the film is not appreciably affected until the surface is brought within a very short distance of the film as when the surface in the present instance is in contact with the film.

From the foregoing description it will be noted that the construction is such that no change is necessary in the construction of the camera except for the opening for the writing surface, that the operation of the autographic device is extremely simple and requires little effort on the part of the operator and that this mechanism is housed within one of the film spool compartments without interfering with the operation of the film spool, and that one of the keys for said film spool is made the instrumentality for operating the device.

It will be further noted that by the use of the septum, which always excludes light from the interior of the camera, the necessity for a door to cover the opening 15 is obviated.

It will also be noted that the autograph is made upon what is ordinarily an unused part of the film or other sensitized material.

I am aware that the specific construction shown and described is capable of variation and modification, and I therefore wish it understood that any changes coming within the scope of the appended claims are within the spirit of my invention.

What I claim as my invention is:

1. The combination, with a camera having an opening in one of its walls, of a data receiving member positionable at the opening for receiving data and movable to data imparting position adjacent the sensitized element in the camera, a septum movably mounted adjacent said opening for excluding light from the interior of the camera at all times, means for causing the data on said member to be printed upon said sensitized element, and mechanism for moving said member into and out of data imparting position.

2. The combination, with a camera having an opening in one of its walls, of a data receiving member positionable at the opening for receiving data and movable to data imparting position adjacent the sensitized element within the camera, said member being provided with a luminous composition, a septum movably mounted adjacent said opening for excluding light from the interior of the camera at all times, and mechanism for moving said member into and out of data imparting position.

3. The combination, with a camera having an opening in one of its walls, of a data receiving member positionable at said opening for receiving data and movable to data imparting position adjacent the sensitized element within the camera, mechanism for moving said member into and out of data imparting position, a septum movably mounted on said camera adjacent said opening for excluding light from the interior of the camera at all times, and luminous means for causing the data on said member to be printed upon said sensitized element.

4. The combination, with a camera having an opening in one of its walls, of a septum movably disposed adjacent said opening at all times, a data receiving and printing member positionable at said opening for receiving data and movable relatively to said septum into data imparting position, means for causing the data on said member to be printed upon the sensitized element within the camera, mechanism for conjointly operating said septum and said member, and means exterior of the camera for controlling the operation of said mechanism.

5. The combination, with a camera having a film supply and a film winding device therein, and compartments in which said film supply and said winding devices are respectively located, said camera having an opening in one of its walls communicating with one of said compartments, of a data receiving and printing member positionable at said opening for receiving data and movable to data imparting position adjacent the film, means including a movable septum disposed adjacent said opening for excluding light from the interior of the compartment, means for causing the data on said member to be printed upon the film, mechanism within said compartment for moving said member into and out of data imparting position, and means for controlling said mechanism from outside the camera.

6. The combination, with a camera having a film supply and a film winding device therein including a winding spool on to which the film passes, keys for said spool extending outside the camera, and a compartment in which said spool is located, said camera having an opening in one of its walls communicating with said compartment, of printing means normally disposed at said opening and movable to printing position adjacent the film, means for excluding light from the interior of said compartment, means for causing the printing on said film, and mechanism operatively connected to one of said spool keys for moving said printing means into and out of printing position on the movement of said key.

7. The combination, with a camera having an opening in one of its walls, of a movable septum disposed adjacent said opening, a member having a writing surface normally disposed at said opening for receiving data and movable with said septum and relatively with respect thereto into data imparting position, mechanism for moving said septum and for moving said writing member into and out of data imparting position, and means for causing the data on the surface of said member to be printed upon the sensitized element within the camera.

8. The combination, with a camera having an opening in one of its walls, of a septum movably mounted within the camera adjacent said opening and having a pocket therein, a member having a writing surface normally disposed at said opening and in said pocket for receiving data and movable with said septum and out of said pocket into data imparting position, mechanism for moving said septum and writing member, and means for causing the data on the surface of said writing member to be printed upon the sensitized element within the camera, said mechanism being operable from without the camera.

9. The combination, with a camera having a film supply and a film winding device therein, and compartments in which said film supply and said winding devices are respectively located, said camera having an opening in one of its walls communicating with one of said compartments, of a data receiving member movable to data receiving position at the opening and to data imparting position adjacent the film, a movable septum disposed adjacent said opening to exclude light from said compartment at all times, mechanism for conjointly moving said septum and member for a pre-determined distance and thereafter independently moving said member into printing contact with the film, means for controlling said mechanism from the outside of the camera, and means for causing the data on said member to be printed upon the film.

10. The combination, with a camera having a film supply and a film winding device therein, and compartments in which said film supply and said winding devices are respectively located, said camera having an opening in one of its walls communicating with one of said compartments, of a data receiving and printing member movable to data receiving position at the opening and to data imparting position adjacent the film, a movable septum disposed adjacent said opening to exclude light from said compartment at all times, mechanism for moving said member into printing contact with the film and the septum to exclude light during the printing operation, means for controlling said mechanism from without the camera, and means for causing the data to be printed on the film.

11. The combination, with a roll film camera having a film supply and a film winding device therein, compartments in which said film supply and said winding devices are respectively located, a picture taking compartment, and film guide rollers in said winding device compartments and spaced from said picture taking compartment, said camera having an opening in one of its walls communicating with the interior of the camera, of printing means including a writing member having a surface normally disposed at said opening, means for preventing light from passing through said opening, means for causing the writing on said surface to be printed on the film, and mechanism for moving the writing member from the opening to printing position between the picture compartment and one of said film guide rollers, said mechanism being operable from the exterior of the camera.

12. The combination, with a camera having a film supply and a film winding device disposed therein, and compartments in which said film supply and said winding devices are respectively located, said compartments having curved walls, said camera having an opening extending through the curved wall of one of said compartments, of printing means including a writing member having a surface normally disposed at said opening, a septum revolubly mounted in said compartment adjacent the opening therein and shaped to conform to the curved wall thereof, means for causing the writing on said surface to be printed upon the film, and mechanism for partially rotating said septum and for moving said writing member into and out of printing position.

13. The combination, with a camera having an exterior opening therein, a printing means movable from data receiving position at the opening to data imparting position adjacent the film in the camera, means including a movable septum for excluding light from the interior of the camera, said septum having a pocket therein for receiving a marking device, means for causing printing on said film, and mechanism for moving the printing means into and out of position.

14. In an autographic camera, the combination, with a camera having a film supply and a film winding device, said film winding device including a winding spool on to which said film passes, a journal key for the spool extending outside the camera, and a compartment in which said spool is located, said camera having an opening extending from the outside thereof into said compartment, of a member having a surface for receiving markings, means for excluding light from the interior of said compartment, means for causing the markings on said member to be printed upon the film, and mechanism operatively connected to said journal key for moving said member into and out of printing position on the turning of said key.

15. In an autographic camera, the combination, with a camera having a film supply and a film winding device therein, said film winding device including a winding spool on to which said film passes, a journal key and a winding key for the spool extending outside of the camera, and a compartment in which said spool is located, said camera having an opening extending from the outside thereof into said compartment, of a member having a surface for receiving markings, a septum journaled on said spool keys adjacent the opening for normally excluding light from the camera, means for causing the markings to be printed on the film, and mechanism operatively connected to said journal key for moving said member into and out of printing position and the septum to exclude light during the printing operation on the turning of said key.

16. The combination, with a camera having a film supply and a film winding device, said film winding device including a winding spool on to which the film passes, a journal key for the spool extending outside the camera, and a compartment in which said spool is located, said camera having an opening extending from the outside thereof into said compartment, of a member having a surface for receiving markings and a luminous composition applied thereto, means for excluding light from the interior of said compartment, and mechanism operatively connected to said journal key for moving said member into and out of printing position on the turning of said key.

17. The combination, with a camera having a film supply, a winding spool onto which the film passes, a journal key and a winding key for the spool extending outside of the camera, and a compartment in which said spool is located, said camera having an opening extending from the outside thereof into said compartment, of a member having a surface for receiving markings and a luminous composition applied thereto, a septum journaled on said spool keys adjacent the opening for normally excluding light from the camera, and mechanism operatively connected to said journal key for moving said member into and out of printing position and the septum to exclude light during the printing operation on the turning of said journal key.

18. The combination, with a camera having an opening through one of its walls, of a septum journaled within the camera and disposed adjacent the said opening, a data receiving and printing member positionable at said opening and in front of said septum and movable to data imparting position against the film in the camera, and away from said septum, means for causing the data on said member to be printed upon said film, mechanism for conjointly operating said septum and member, and a key without the camera operatively connected to said mechanism for controlling its operation.

19. In an autographic camera, the combination, with a camera having an opening through one of its walls, of a data receiving and printing member positionable at said opening for receiving data and movable to data imparting position against the sensitized element within the camera, means for causing the data on said member to be printed upon said sensitized element, mechanism for moving said member comprising a revoluble support, a lever secured to said member and pivotally connected to said support, a journal for said support, a crank secured to said journal, a link operatively connected to said crank and lever, and means for turning said journal.

20. The combination, with a camera having inner compartment provided with a curved wall and an opening through said wall into said compartment, of a septum journaled in said compartment and having a portion shaped to conform to the curved wall thereof adjacent the opening to exclude light, a data receiving and printing member positionable in said opening in front of said septum and movable to data imparting position against the sensitized element within the camera, means for causing the data on said member to be printed upon said sensitized element, mechanism for moving said septum and member comprising a journal for said septum, a lever secured to said member and pivotally connected to said septum, a crank secured to said journal, a link operatively connected to said crank and lever, and means for turning said journal.

In testimony whereof I affix my signature.

JOHN P. BETHKE.